(12) United States Patent
Roo et al.

(10) Patent No.: US 8,319,817 B2
(45) Date of Patent: Nov. 27, 2012

(54) METHOD AND APPARATUS FOR VIDEO CALL USING TRANSMISSION OF DIVIDED IMAGE FRAMES

(75) Inventors: Kyung Yun Roo, Daegu Metropolitan (KR); Eun Young Choi, Gumi-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 637 days.

(21) Appl. No.: 12/544,790

(22) Filed: Aug. 20, 2009

(65) Prior Publication Data

US 2010/0045772 A1  Feb. 25, 2010

(30) Foreign Application Priority Data

Aug. 20, 2008 (KR) ........................ 10-2008-0081523

(51) Int. Cl.
 *H04N 7/14* (2006.01)

(52) U.S. Cl. .................................. 348/14.01; 348/14.12

(58) Field of Classification Search ............... 348/14.01, 348/14.02, 14.12–14.15; 375/240, 240.24, 375/240.26
See application file for complete search history.

(56) References Cited

U.S. PATENT DOCUMENTS

| 6,674,477 B1 | 1/2004 | Yamaguchi et al. |
| 2007/0098078 A1 | 5/2007 | Kim et al. |

FOREIGN PATENT DOCUMENTS

| JP | 11-225168 A | 8/1999 |
| KR | 10-0750137 B1 | 8/2007 |
| KR | 10-0770963 B1 | 10/2007 |
| WO | 01/72030 A2 | 9/2001 |

*Primary Examiner* — Tuan Nguyen
(74) *Attorney, Agent, or Firm* — Jefferson IP Law, LLP

(57) ABSTRACT

A method and an apparatus for a video call using transmission of divided image frames are provided. A transmitting mobile terminal captures a still image with the first resolution at a predefined period, divides the captured image into images with the second resolution that is smaller than the first resolution, and transmits the divided images to a receiving mobile terminal. Then the receiving terminal receives the divided images at a predefined period, creates a combined image corresponding to the initial still image from the divided images, and outputs the combined image on a display unit.

19 Claims, 8 Drawing Sheets

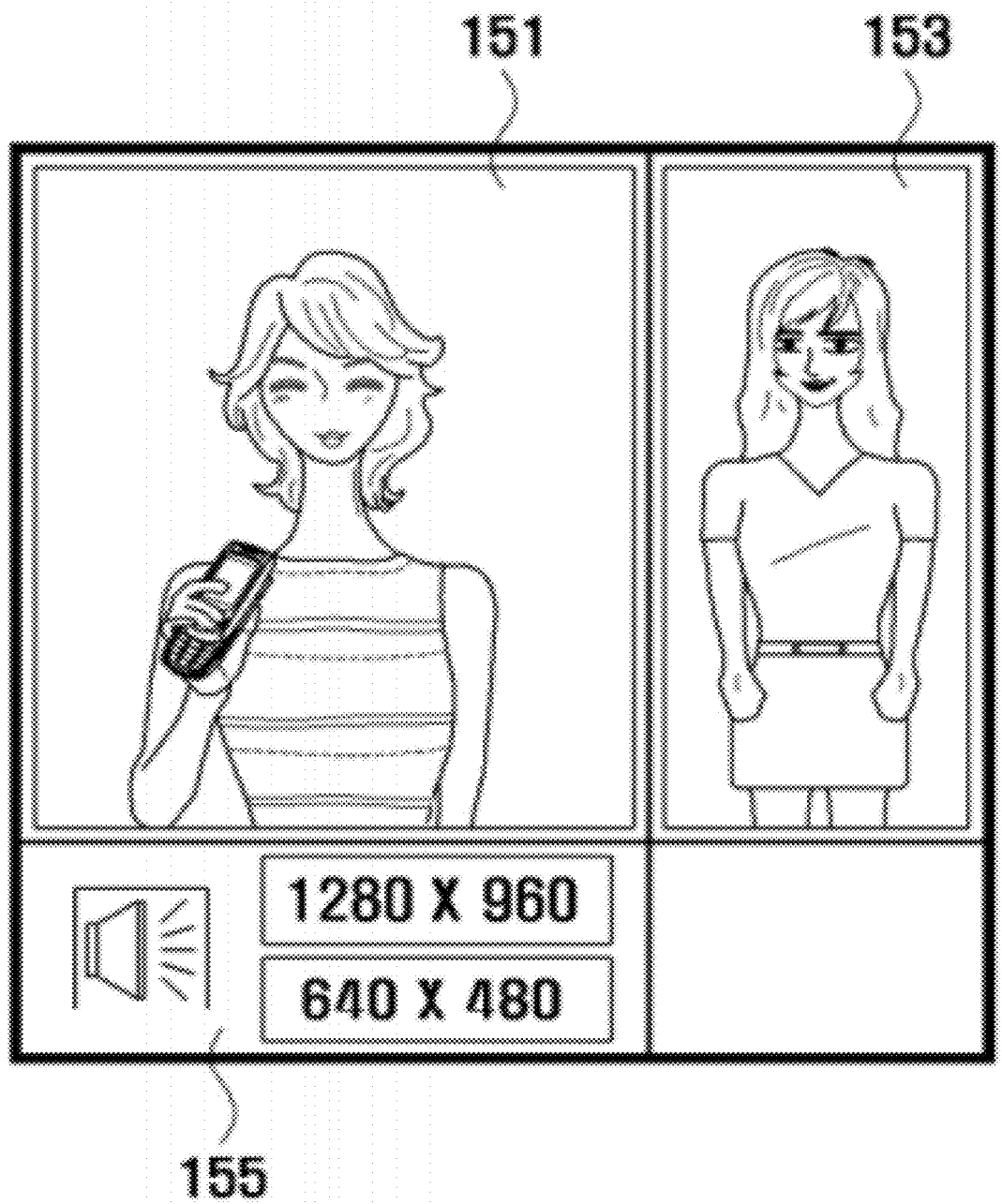

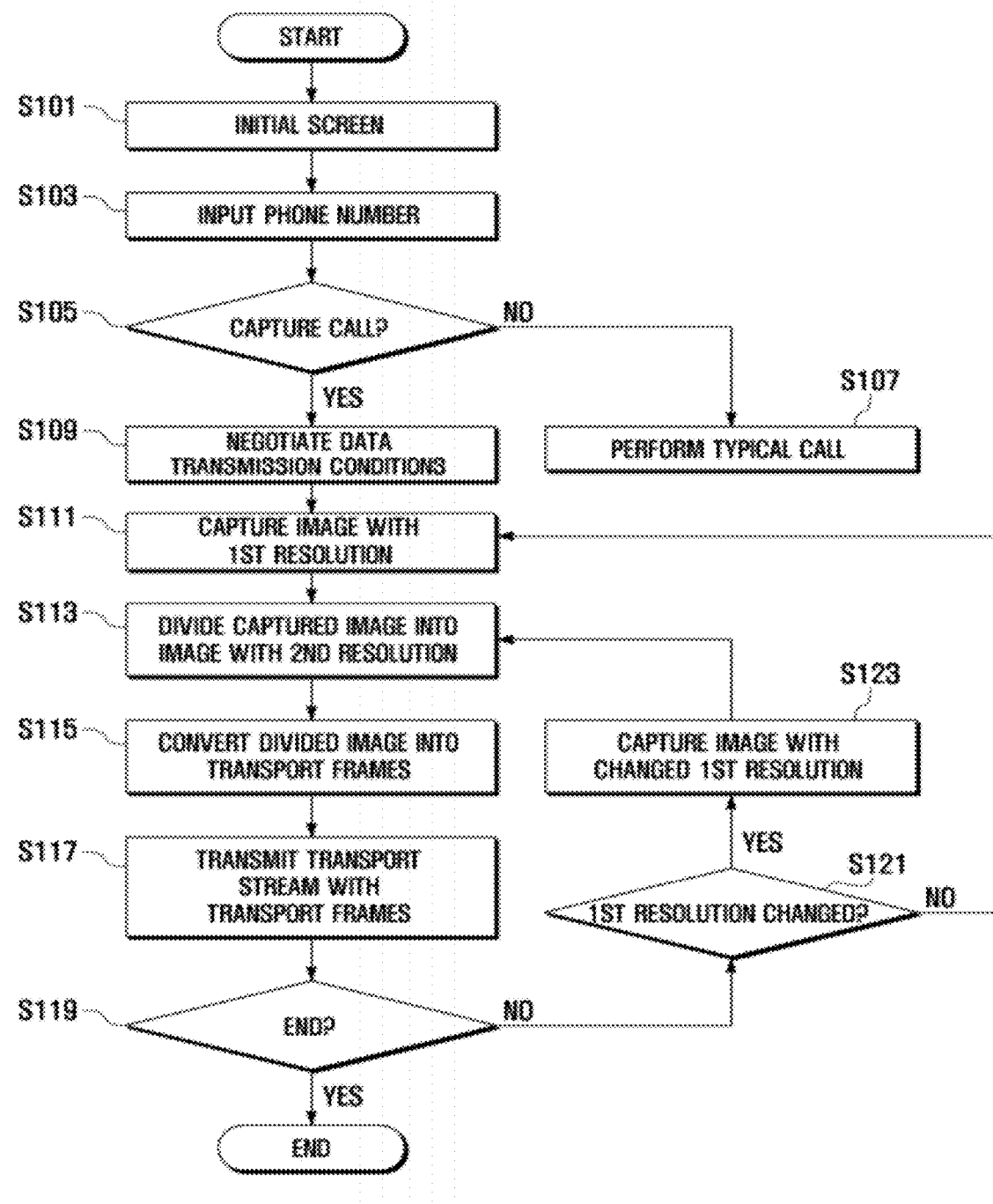

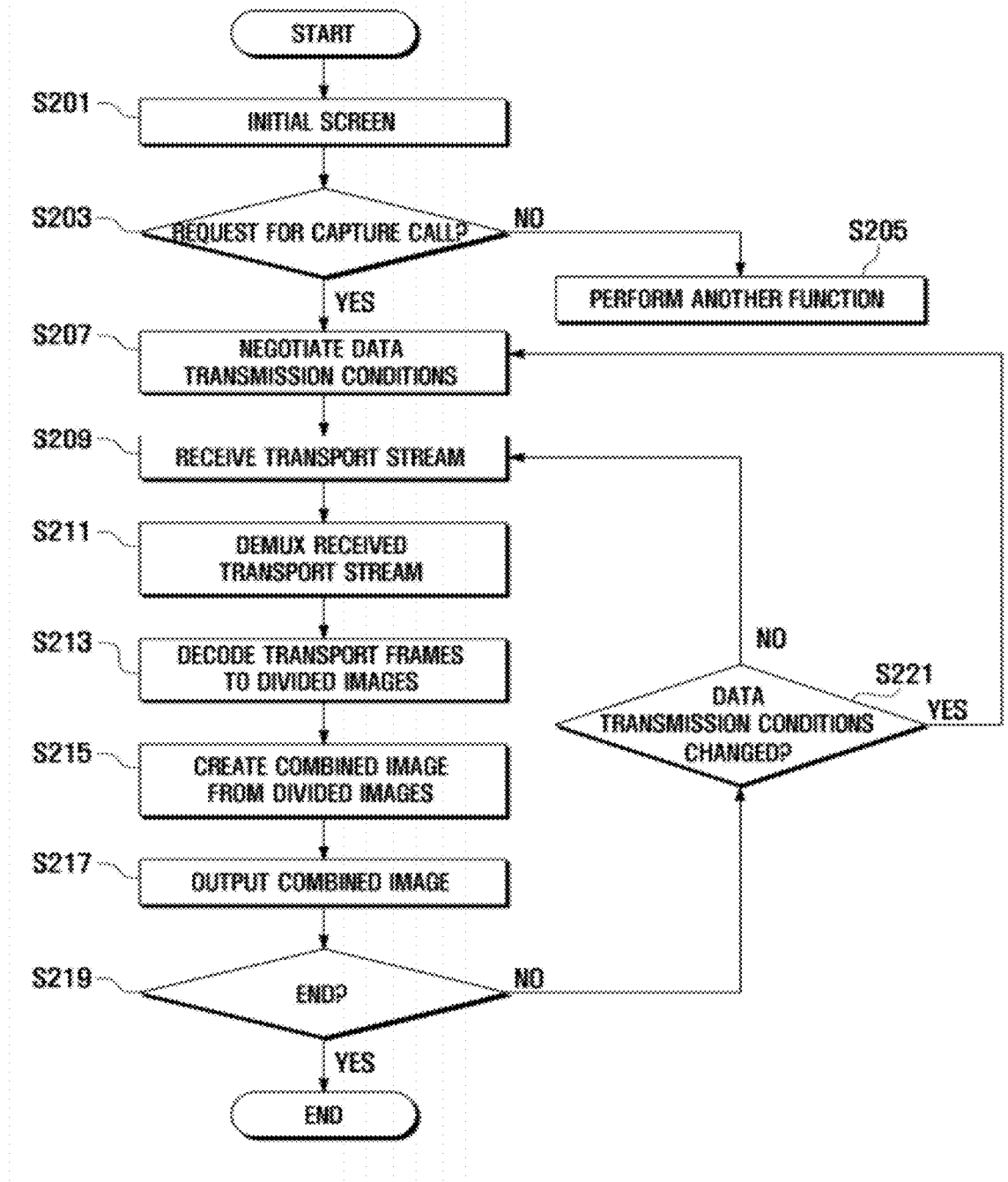

METHOD AND APPARATUS FOR VIDEO CALL USING TRANSMISSION OF DIVIDED IMAGE FRAMES

PRIORITY

This application claims the benefit under 35 U.S.C. §119(a) of a Korean patent application filed in the Korean Intellectual Property Office on Aug. 20, 2008 and assigned Serial No. 10-2008-0081523, the entire disclosure of which is hereby incorporated by reference.

BACKGROUND OF THE INVENTION

1. Field of the Invention

The present invention relates to video call technology. More particularly, the present invention relates to a video call method and a related apparatus which may include dividing an image captured by a camera at a transmitting terminal into frames, transmitting the divided frames to a receiving terminal, and combining the divided frames at the receiving terminal to realize a video call with an improved quality.

2. Description of the Related Art

A mobile communication terminal, also referred to as a mobile device, a portable device, a cellular phone, a handheld device, etc., enables persons in different locations to easily and immediately transmit information to each other. Due to advancements in communication technology, a conventional mobile communication terminal has a variety of functions such as a video call, multimedia file play, or wireless internet access, in addition to traditional functions of a voice call and a short message service.

More particularly, many conventional mobile terminals have a digital camera function, so a user can easily take a still image or record a video. Additionally, such an image or a video cannot only be stored in his or her mobile terminal, but can also be transmitted to other terminals. A video call is one of several features found in a conventional mobile terminal that includes a built-in camera.

However, a conventional video call may utilize a narrow frequency bandwidth that is not sufficient to transmit a large amount of data in real time. Under such unavoidable circumstances, a conventional video call may transmit poor-quality images. It is therefore not easy to perceive images displayed on a screen of the terminal during a video call. In addition, such images may sometimes pause. Further, these undesirable problems may become worse when a target object is moving.

SUMMARY OF THE INVENTION

An aspect of the present invention is to address at least the above-mentioned problems and/or disadvantages and to provide at least the advantages described below. Accordingly, an aspect of the present invention is to provide a method and apparatus that can realize a high-quality video call.

In accordance with an aspect of the present invention, a method for transmitting a video call is provided. The method includes acquiring a still image with a first resolution at a predefined period by using a camera module, dividing the still image into a plurality of images with a second resolution that is smaller than the first resolution, encoding the plurality of divided images into transport frames, respectively, converting the transport frames into a transport stream, and transmitting the transport stream at the predefined period.

The transmitting method may further comprise negotiating with a counterpart mobile terminal regarding data transmission conditions to determine the second resolution, the counterpart mobile terminal receiving the transport stream.

Also, the transmitting method may further comprise determining whether the data transmission conditions are changed.

Also, the transmitting method may further comprise, if the data transmission conditions are changed, modifying at least one of the predefined period, the first resolution, and a number of the transport frames of the transport stream transmitted per second.

Also, the transmitting method may further comprise determining whether the first resolution is changed, and if the first resolution is change, changing the predefined period.

Also, the transmitting method may further comprise inserting information regarding the number of the divided images corresponding to the single still image into a header of a first one of the transport frames.

Also, the transmitting method may further comprise acquiring audio signals, wherein the transmitting of the transport stream includes assigning the audio signals to the respective transport frames, and inserting the audio signals into the transport stream.

In accordance with another aspect of the present invention, a method for receiving a video call is provided. The method includes receiving a transport stream including a specific number of transport frames at a predefined period, retrieving the specific number of transport frames from the transport stream, restoring the transport frames to divided images, respectively, creating a combined image by combining the divided images, and outputting the combined image at the predefined period.

The receiving method may further comprise checking a header of a first one of the transport frames, and determining the specific number of the transport frames from the header of the first one of the transport frames.

In the receiving method, the creating of the combined image may be based on the number of the divided images that correspond to the specific number of the transport frames.

Also, the receiving method may further comprise negotiating with a counterpart mobile terminal regarding data transmission conditions for receiving the transport stream, the counterpart mobile terminal transmitting the transport stream.

Also, the receiving method may further comprise determining whether the data transmission conditions are changed, and if the data transmission conditions are changed, modifying the predefined period.

Also, in the receiving method, the combined image may have a first resolution and the divided images may have a second resolution smaller than the first resolution.

In accordance with yet another aspect of the present invention, an apparatus for a video call is provided. The apparatus includes a camera module for acquiring a still image, an image receiving part for controlling the camera module so that the camera module acquires the still image with a first resolution at a predefined period, a frame dividing part for dividing the still image into a plurality of images with a second resolution that is smaller than the first resolution, and a frame processing part for encoding the plurality of divided images into transport frames, respectively, for converting the transport frames into a transport stream, and for transmitting the transport stream at a predefined period.

In the apparatus, the frame processing part may receive the transport stream at the predefined period, retrieve the transport frames from the received transport stream, and restore the retrieved transport frames to the respective divided images with the second resolution.

The apparatus may further comprise a frame combining part for creating a combined image with the first resolution by combining the divided images, and a display unit for outputting the combined image at the predefined period.

Also, in the apparatus, the frame processing part may negotiate with a counterpart mobile terminal regarding data transmission conditions to determine the second resolution, the counterpart mobile terminal receiving the transport stream.

Also, in the apparatus, the frame processing part may determine whether the data transmission conditions are changed, and if the data transmission conditions are changed, modify at least one of the predefined period, the first resolution, and a number of the transport frames transmitted per second.

Also, in the apparatus, the frame processing part may insert information regarding the number of the divided images corresponding to the single still image into a header of a first one of the transport frames.

Also, the apparatus may further comprise an audio processing unit for acquiring and processing audio signals, wherein the frame processing part assigns the audio signals to the respective transport frames, and inserts the audio signals into the transport stream.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A to 5C are exemplary views that illustrate an interface of a display unit according to an exemplary embodiment of the present invention.

FIG. 6 is a flow diagram that illustrates a transmitting method for a video call according to an exemplary embodiment of the present invention.

FIG. 7 is a flow diagram that illustrates a receiving method for a video call according to an exemplary embodiment of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A video call apparatus of exemplary embodiments of the present invention includes a mobile communication terminal, but the present invention is not limited thereto. A mobile communication terminal in exemplary embodiments of the present invention has a module configured to support a video call function. More specifically, a mobile communication terminal according to exemplary embodiments of the present invention may be a mobile phone, a wired or wireless phone, a Personal Digital Assistant (PDA), a smart phone, a notebook, a personal computer, a Wideband Code Division Multiple Access (WCDMA) terminal, a wireless internet terminal such as a Wibro terminal, an International Mobile Telecommunication 2000 (IMT-2000) terminal, a Global System for Mobile communication/General Packet Radio Service (GSM/GPRS) terminal, and a Universal Mobile Telecommunication Service (UMTS) terminal. Alternatively, exemplary embodiments of the present invention may employ any other types of communication devices, portable devices, multimedia devices, and their suitable equivalents.

Figure 1:
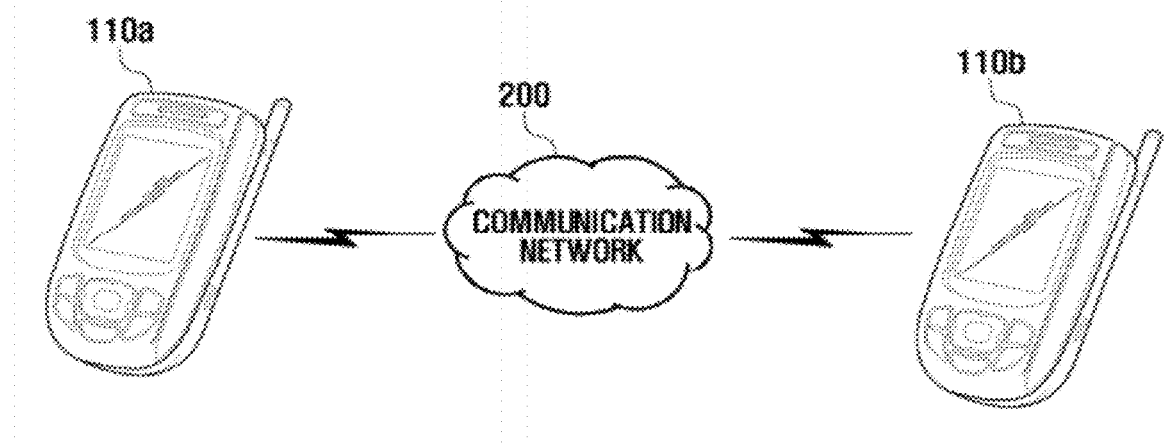
FIG. 1 is a schematic view that illustrates a video call system using a video call apparatus according to an exemplary embodiment of the present invention.

FIG. 1 is a schematic view that illustrates a video call system using a video call apparatus according to an exemplary embodiment of the present invention.

Referring to FIG. 1, the system includes at least two mobile communication terminals 100a, 100b and a communication network 200.

The communication network 200 sends and receives transport frames to and from the mobile terminals 100a and 100b. As is well known in the art, the communication network 200 may include a base station (not shown) which establishes communication channels with the mobile terminals 100a and 100b, a base station controller (not shown) which controls the base station, a mobile switching center (not shown) which controls the base station controller and switches a call, and a billing unit (not shown) which performs billing for the mobile terminals 100a and 100b. More particularly, the communication network 200 according to exemplary embodiments of the present invention may deliver the transport frames in the form of streams.

The mobile terminals 100a and 100b include a module configured to support a video call such as a video call that comports with the H.324M standard. When a video call is initiated, the transmitting and receiving mobile terminals 100a and 100b negotiate the video quality and the transport frame rate, both of which may depend on their own characteristics. Then, based on the video quality and transport frame rate, each of the mobile terminals 100a and 100b executes a video call and a related capture call function. Unless a video call is reestablished, the video quality and transport frame rate may be maintained until a video call and a related capture call function are ended.

While a capture call function is executed, each of the mobile terminals 100a and 100b captures images with a first resolution as still images by using a camera that is installed therein. Then, each mobile terminal 100a and 100b divides each captured image with the first resolution into a plurality of images with a second resolution. For example, the first resolution may be 640*480 pixels, and the second resolution may be 160*120 pixels. That is, in this example, the captured image with the first resolution can be divided into sixteen images with the second resolution.

The divided images are converted into transport frames to be delivered between mobile terminals 100a and 100b via the communication network 200. The mobile terminal which receives the transport frames creates a combined image by combining the transport frames, and then outputs the combined image. The above-discussed procedure for the mobile terminals 100a and 100b is repeated at predefined time intervals. Hereafter, the above-discussed procedure will be referred to as a capture call function.

The above-discussed mobile terminal is described in more detail below with reference to FIG. 2. The mobile terminal illustrated in FIG. 2 corresponds to each of the mobile terminals 100a and 100b illustrated in FIG. 1. Such mobile terminals may perform data transmission and reception during a video call.

Figure 2:
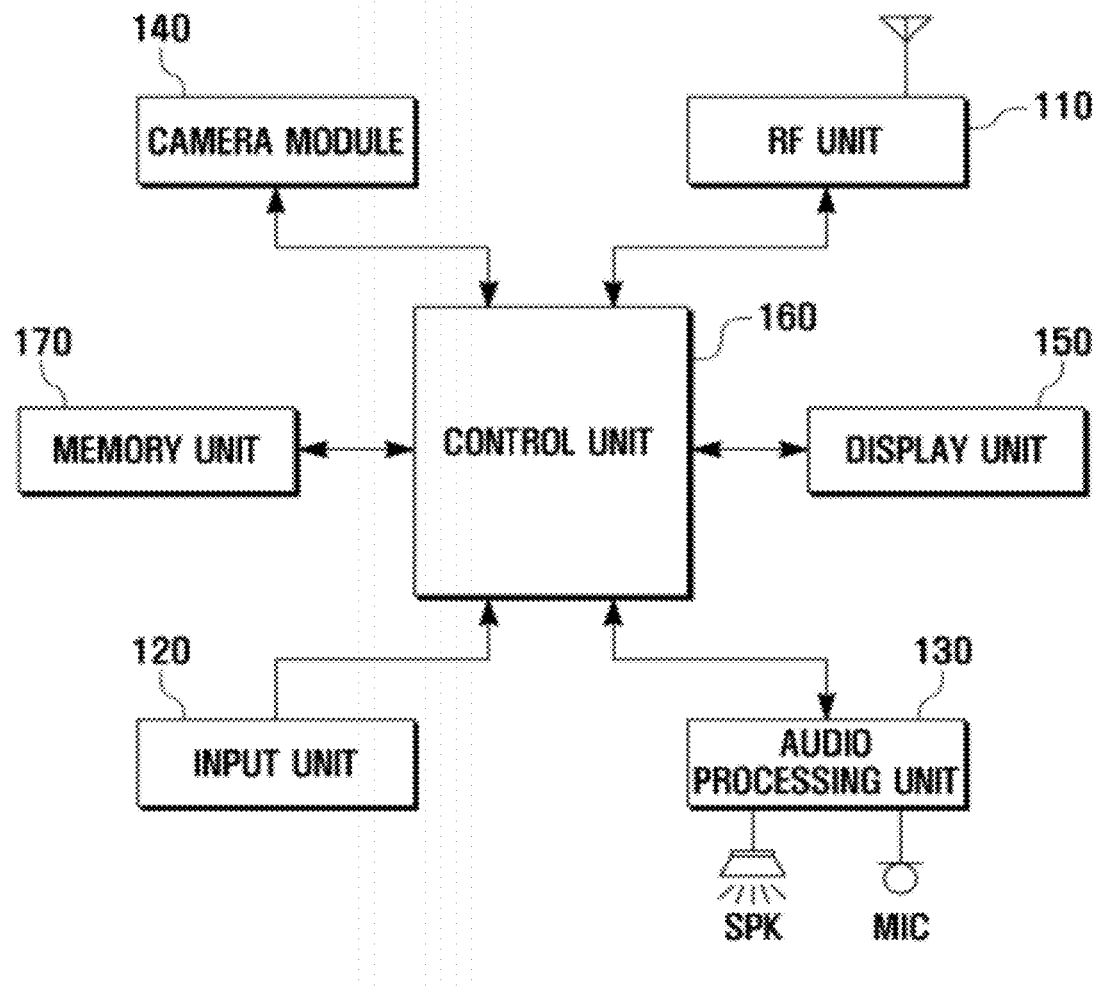
FIG. 2 is a block diagram that illustrates a configuration of a mobile terminal according to an exemplary embodiment of the present invention.

Referring to FIG. 2, each of the first mobile terminal 100a and the second mobile terminal 100b includes a Radio Frequency (RF) unit 110, an input unit 120, an audio processing unit 130, a camera module 140, a display unit 150, a control unit 160, and a memory unit 170.

The RF unit 110 transmits and receives transport frames under the control of the control unit 160. The RF unit 110 may include an RF transmitter that upwardly converts the frequency of transmitted signals and amplifies the transmitted signals, and an RF receiver that amplifies received signals with low-noise and downwardly converts the frequency of the received signals.

More specifically, the RF unit 110 in exemplary embodiments of the present invention sends and receives, under the control of the control unit 160, a plurality of transport frames corresponding to a single captured image while a capture call function is executed. Also, the RF unit 110 sends and receives data associated with video call characteristics of the mobile terminal 100, such as the video quality and the transport frame rate. For example, if the first mobile terminal 100a and the second mobile terminal 100b have a transport frame rate of 56 kbps and 64 kbps, respectively, the transport frame rate between both mobile terminals 100a and 100b may preferably be determined to be 56 kbps. Data associated with the video quality and the transport frame rate may be included in respective profiles of the mobile terminals 100a and 100b. By exchanging such profiles, each of the mobile terminals 100a and 100b can become aware of video call characteristics of its counterpart terminal.

Once the video call characteristics are determined, the mobile terminals 100a and 100b send and receive the transport frames corresponding to a single captured image through their RF units 110. The video call characteristics may vary according to the features or conditions of a network. If the conditions of a network are poor, the mobile terminal 100a and 100b may restrict the number of the transport frames delivered per second. If the conditions of a network are good and thus support a specified rate of frame transmission, the RF unit 110 may allow the delivery of fifteen transport frames per second, for example. However, if the conditions of a network are poor and thus fail to support a specified rate of frame transmission, the mobile terminals may deliver merely four or five frames per second, for example. The degradation of network conditions may be caused by various factors such as traffic due to an increase in users and a reduction in data processing rate at network sources.

The input unit 120 includes a number of alphanumeric keys and function keys (not shown) arranged for efficient data entry. The function keys may have navigation keys, side keys, shortcut keys, and other kinds of special keys. The input unit 120 creates key input signals related to a user's setting or a function control of the mobile terminals 100a and 100b, and then sends the key input signals to the control unit 160. More particularly, the input unit 120 creates input signals for initiating and ending a capture call function and then conveys them to the control unit 160. In an exemplary embodiment, the input unit 120 may receive a user's selection for a capture call function after a video call is initiated, and thereby create an input signal to activate a capture call function.

The audio processing unit 130 includes a SPeaKer (SPK) which outputs audio data received during a video call, and a MICrophone (MIC) which acquires a user's voice and other audio signals during a video call. While a capture call function is activated, the audio processing unit 130 executes the processing of audio data. In this case, the audio data may be inserted into transport streams into which the transport frames are converted for delivery. That is, the control unit 160 may assign audio signals to the respective transport frames and insert them into the transport streams when the transport frames are converted into the transport streams.

The camera module 140 acquires images for a capture call function and a video call and transmits the images to the control unit 160. More specifically, the camera module 140 includes a lens (not shown) which obtains an optical signal, an image sensor (not shown) which converts an optical signal into an electrical signal, and a signal processor (not shown) which converts an analog image signal into a digital image data. The image sensor may be, but is not limited to, a Charge Coupled Device (CCD) or a Complementary Metal Oxide Semiconductor (CMOS) image sensor. The signal processor may be, but is not limited to, a conventional Digital Signal Processor (DSP). When the camera module 140 sends the acquired images to the control unit 160, the images may also be sent to the display unit 150 in the form of preview images.

The display unit 150 may present the images taken by the camera module 140 on a screen in the form of preview images. The display unit 150 may include a Liquid Crystal Display (LCD) or any other equivalent. In the case of LCD, the display unit 150 may include an LCD controller, a memory, and an LCD unit. Additionally, the display unit 150 may include a touch screen, which also acts as an input unit.

In particular, the display unit 150 according to an exemplary embodiment of the present invention may display a screen related to the selection of a capture call function, a preview screen produced by the activation of a capture call function, and a screen containing a combined image created from the transport frames by the activation of a capture call function during a video call. The preview screen may include an image preview screen which outputs a real-time image based on a video call, and a capture preview image which corresponds to a still image captured at a specific time. A screen interface of the display unit 150 will be explained in more detail further below.

The memory unit 170 stores a variety of programs and data including application programs used for functions related to exemplary embodiments of the present invention, an application program used for a capture call function, an application program used for a video call, an application program used for the camera module 140, user's data, and data created while such application programs are executed. Here, an application program for a capture call function may be considered as a sub-menu of an application program for a video call. The memory unit 170 may act as a buffer which temporarily stores the transport frames by a predefined size while a capture call function is executed.

The memory unit 170 may include a program region and a data region. The program region stores an Operating System (OS) for booting the mobile terminals 100a and 100b, application programs for the operation of the camera module 140 and the acquisition of audio data to execute a capture call function and a video call, and other application programs for optional functions of the mobile terminals 100a and 100b such as functions of reproducing a sound, an image, or a video. Furthermore, the program region may store a program for supporting a capture call function, which may be offered as an optional function of a video call program. When a user requests the activation of any of the above functions, the mobile terminals 100a and 100b provide the requested functions under the control of the control unit 160 by using corresponding application programs.

The data region stores data created during the operation of the mobile terminals 100a and 100b. For example, the data region may store recorded data during the execution of a capture call function, captured images at the camera module 140, and user's data related to optional functions of the mobile terminals 100a and 100b. Here, user's data may include video, phonebook data, audio data, contents, and related information. Furthermore, the data region may store the captured images and their divided images to be delivered to the RF unit 110 under the control of the control unit 160.

The control unit 160 controls the supply of power, the activation of units, and the flow of signals between the units in the mobile terminals 100a and 100b. More particularly, the control unit 160 of an exemplary embodiment of the present invention creates the transport frames, based on a video call standard, corresponding to the captured images obtained according to the execution of a capture call function. The transport frames are mixed with audio data and control signals under the control of the control unit 160 and then sent to the receiving terminal. To execute the above steps, the control unit 160 includes a frame dividing part for processing the captured images, and a frame processing part for transmitting the divided frames.

Hereinafter, a detailed configuration of the control unit 160 for processing images will be described with reference to FIG. 3.

Figure 3:
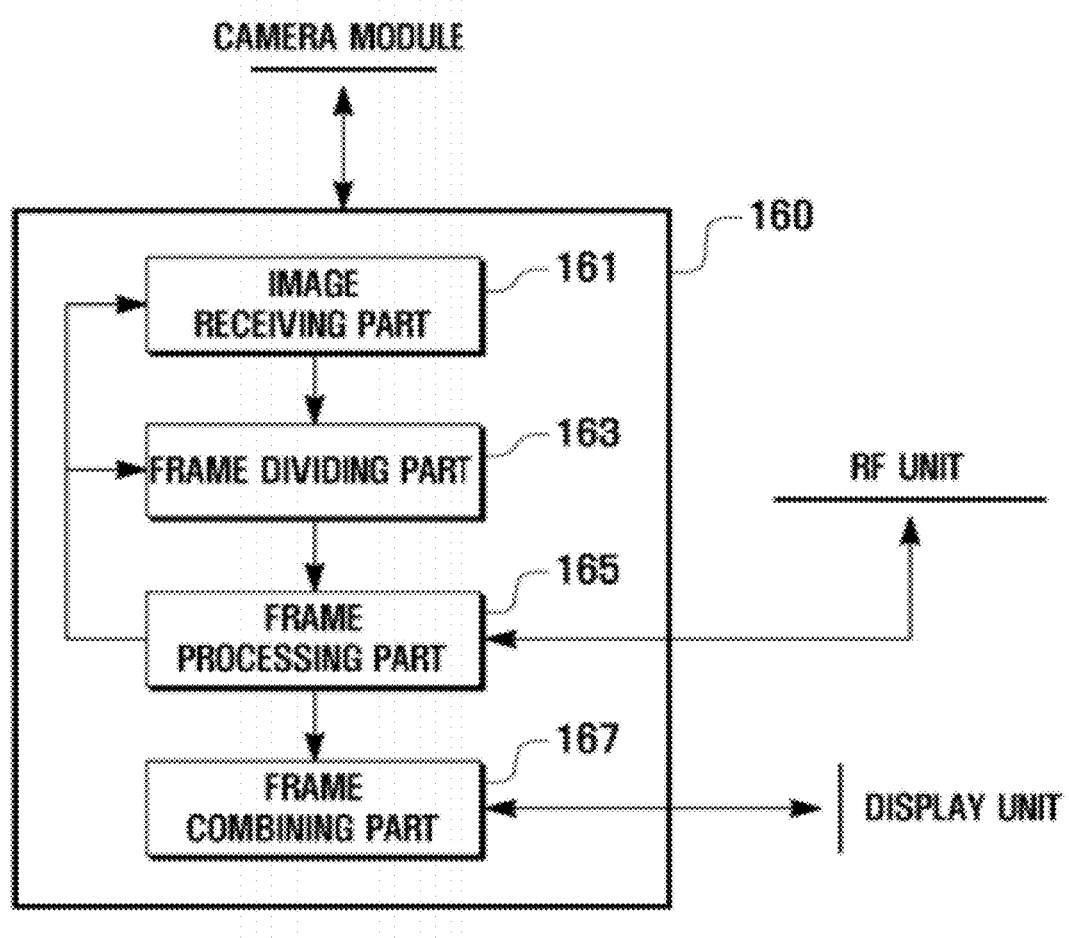
FIG. 3 is a block diagram that illustrates a configuration of a control unit according to an exemplary embodiment of the present invention.

FIG. 3 is a block diagram that illustrates a configuration of a control unit according to an exemplary embodiment of the present invention.

Referring to FIG. 3, the control unit 160 includes an image receiving part 161, a frame dividing part 163, a frame processing part 165, and a frame combining part 167.

The image receiving part 161 controls setting of the resolution of the camera module 140 when a capture call function is activated from the input unit 120. For example, the image receiving part 161 controls the camera module to capture a current image with the first resolution. Here, the first resolution may be set by a user's choice or predefined as a default value. To allow the first resolution to be set by a user's choice, the mobile terminal may provide a menu for setting the first resolution together with the activation of a capture call function. The first resolution may be 1024*768 pixels, 640*480 pixels, and so forth. The image receiving part 161 delivers the captured image with the first resolution to the frame dividing part 163.

The frame dividing part 163 divides the captured image with the first resolution into a plurality of images with the second resolution, and then delivers the divided images to the frame processing part 165. For example, if the captured image has the first resolution of 640*480 pixels, the frame dividing part 163 may divide the captured image into sixteen images with the second resolution of 160*120 pixels. Here, the second resolution may have different values such as 176*144 pixels. If the captured image with the first resolution of 640*480 pixels is divided into sixteen images with the second resolution of 176*144 pixels, all the divided images do not have the same size. That is, peripherally located images may have smaller sizes than the other divided images.

The size of the second resolution, namely, the division criterion of the captured image in the frame dividing part 163, may vary according to the result of negotiation for data transmission conditions between the mobile terminals. That is, when the mobile terminals negotiate with each other regarding data transmission conditions, they may agree on a specific resolution as the size of the transmission image. In this case, the frame dividing part 163 uses the specific resolution as the second resolution and divides the first resolution image into the second resolution sized images.

The negotiation for data transmission conditions may include sending and receiving information regarding characteristics of the mobile terminals, such as the data processing rate and the data transmission standard, when the mobile terminals are establishing a capture call, and thereby determining data transmission conditions that enable communications therebetween. Also, the mobile terminals may receive additional information including parameters, such as system information, helpful to decide data transmission conditions from equipment in the communication network, and then use such information to negotiate transmission conditions regarding network states.

The frame processing part 165 receives the divided images from the frame dividing part 163, converts the divided images into respective transport frames for delivery, and forms a stream of transmission data by mixing all the transport frames with audio data and control signals. Here, it is desirable that the frame processing part 165 inserts information regarding the number of transport frames of a single captured image into a header of the first transport frame. Therefore, when receiving the transmission data from the transmitting mobile terminal, the receiving mobile terminal can know how many transport frames correspond to a single captured image, by checking header data of the first transport frame. Also, the receiving mobile terminal can determine how many transport frames should be required to create a single combined image.

Additionally, the frame processing part 165 may check whether network conditions and transmission profiles between the mobile terminals 100a and 100b are changed while the transport frames are forwarded. More specifically, the frame processing part 165 receives system information from network equipment and thereby decides network conditions. If network conditions require a lower transmission rate, or if the receiving mobile terminal changes the number of receivable transport frames, the frame processing part 165 may limit the number of the transport frames. That is, based on at least one of network conditions, a request of the counterpart terminal, and negotiation conditions of communication standards, the frame processing part 165 may restrict the number of transport frames.

If the number of the transport frames is limited, the transfer period of the captured images is increased. For example, assume that the network condition or the transfer protocol allows for the transmission of ten divided images with 160*120 pixels per second, and assume that the captured image with 640*480 pixels is divided into sixteen images with 160*120 pixels. In that case, the frame processing part 165 may set the transfer period of the captured images to two seconds even when considering a header and redundancy data. However, if the network condition or the transfer protocol is changed to allow for the transmission of six divided images with 160*120 pixels per second, the frame processing part 165 may set the transfer period of the captured images to three seconds. For this, the frame processing part 165 may control the image receiving part 161 to change the image capture time of the camera module when the number of the transport frames varies according to the network condition or the transfer protocol.

Also, the frame processing part 165 may control the image receiving part 161 to change the image capture time according to the resolution of the captured images. More specifically, if the camera module 140 supports a resolution of 1280*960 pixels, the image receiving part 161 sets the resolution of the captured images to 1280*960 pixels according to a user's choice or a predefined default. Then the frame dividing part 163 may divide the captured image with the resolution of 1280*960 pixels into sixty four images with a size of 160*120 pixels. If the divided images with the size of 160*120 pixels are converted into the transport frames and ten frames can be delivered per second, the frame processing part 165 allows the transmission of a single captured image for seven seconds. Therefore, the frame processing part 165 may enable the image receiving part 161 to capture an image at intervals of seven seconds through the camera module.

Furthermore, if the transfer period of the captured images is fixed, the frame processing part 165 regulates the first resolution to be adapted to the fixed period. As discussed above, the image receiving part 161 controls the camera module to capture an image with the first resolution, and the frame dividing part 163 divides the captured image with the first resolution into images with the second resolution and then delivers the divided images to the frame processing part 165. In addition, assume that the frame processing part 165 can deliver the transport frames corresponding to the divided images at a fixed transfer period, for example, at intervals of four seconds. In that case, if network conditions become poor and thereby the number of transport frames per second is reduced to half, the frame processing part 165 may control the image receiving part 161 such that the camera module captures an image with a third resolution that is lower than the first resolution, for example, with a quarter of the first resolution. It is therefore possible to reduce the number of transport frames and to maintain the fixed transfer period of four seconds without changing the period.

In addition, when receiving the transport frames from another mobile terminal, the frame processing part 165 may check a header of the first transport frame and thereby ascertain the entire number of transport frames to be received. Also, the frame processing part 165 decodes the received transport frames, restores the decoded transport frames to the divided images, and delivers the restored images to the frame combining part 167. In an exemplary embodiment, the frame processing part 165 may not ascertain the number of transport frames corresponding to a single captured image. Instead, the frame processing part 165 may consider that the transport frames received for one period correspond to a single captured image. That is, the frame processing part 165 negotiates with the counterpart mobile terminal regarding the transfer period of the captured image after a capture call function is activated, and thereby determines the transfer period. Then, according to the determined transfer period, the frame processing part 165 restores the transport frames received for one period into the divided images, and delivers the divided images to the frame combining part 167.

The frame processing part 165 may include an algorithm such as MPEG4 to encode and decode the divided images, and may include an H.324M module to transmit the transport frames, audio data and control signals to the counterpart mobile terminal.

The frame combining part 167 combines the divided images received from the frame processing part 165, and thereby creates a combined image which corresponds to the captured image initially acquired by the transmitting mobile terminal. Also, the frame combining part 167 outputs the combined image to the display unit 150.

Meanwhile, the control unit 160 may execute a capture call function independently or during a video call. In the latter case, the control unit 160 may receive from the input unit 120 an input signal for transferring to a capture call function while performing a video call after establishing a video call with the counterpart mobile terminal. Then the control unit 160 begins to negotiate with the counterpart mobile terminal regarding the execution of a capture call function. Here, the control unit 160 may negotiate at least one of the resolution of the captured image, the transfer period of the transport frames corresponding to a single captured image, and the number of the transport frames corresponding to a single captured image. Thereafter, the control unit 160 transmits periodically the transport frames divided and converted from the captured image according to the specific period.

Additionally, when receiving from the input unit 120 an input signal for returning to a video call from a capture call function, the control unit 160 controls the camera module 140 to continue a video call. Here, the control unit 160 controls the transmission and reception of video data based on a video call with the counterpart mobile terminal. In this procedure, it is desirable that a video call is maintained to support a capture call function. If a video call maintains the transmission rate more than a given value, it is possible to transfer to a capture call function without a separate negotiation and then return to a video call.

As discussed above, the mobile terminals according to an exemplary embodiment of the present invention do not experience a poor video call with a lower quality, and allow an improved video call by using captured images with a higher quality.

Figure 4A:
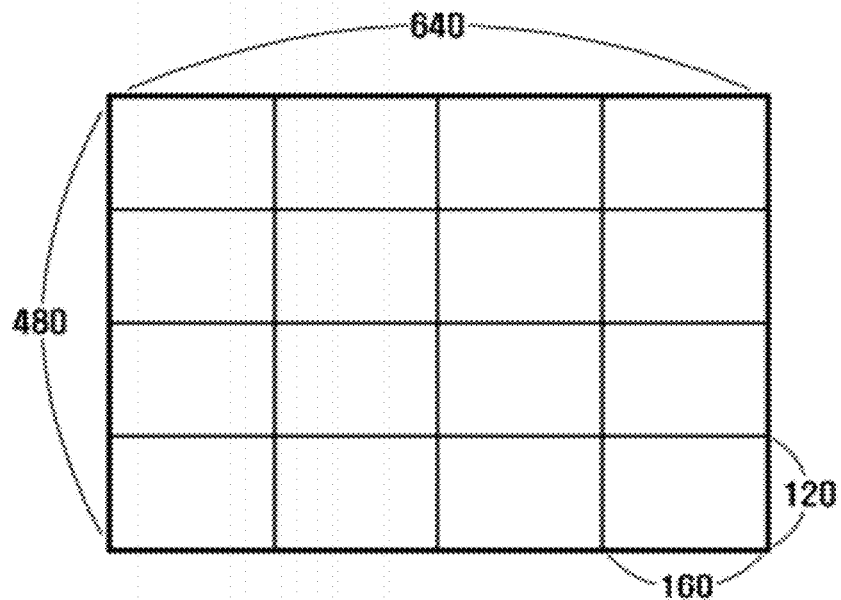
FIGS. 4A and 4B are exemplary views that illustrate the division of frames according to an exemplary embodiment of the present invention.
Figure 4B:
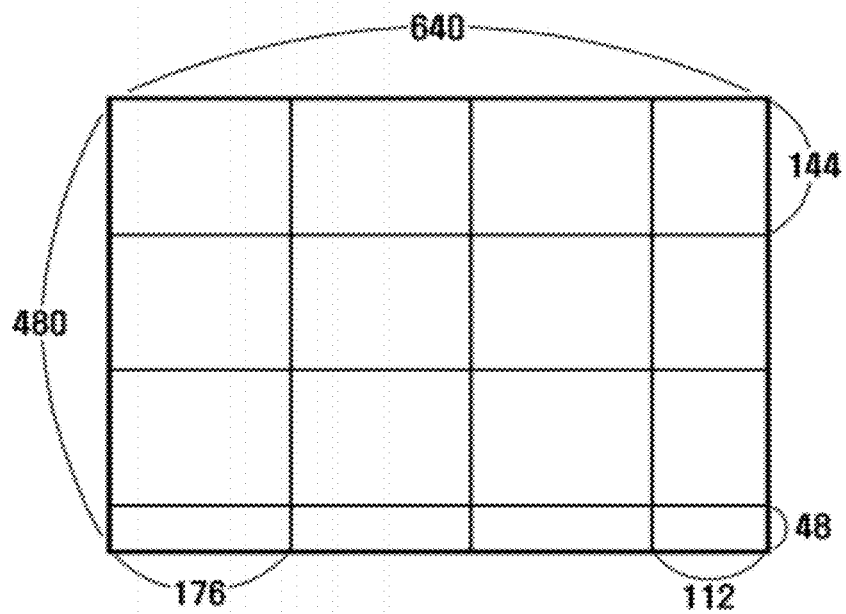

FIGS. 4A and 4B are exemplary views that illustrate the division of frames according to an exemplary embodiment of the present invention.

Referring to FIG. 4A, the above-discussed frame dividing part of the control unit receives the captured image with the first resolution, e.g., 640*480 pixels, from the above-discussed image receiving part, and then divides the captured image into a plurality of, e.g., sixteen, images with the second resolution, e.g., 160*120 pixels. That is, the frame dividing part divides 640 pixels in width into four 160 pixel sections, and divides 480 pixels in length into four 120 pixel sections.

Referring to FIG. 4B, in another case, the frame dividing part divides the captured image with 640*480 pixels into images with 176*144 pixels. That is, the frame dividing part divides 640 pixels in width into three 176 pixel sections and one 112 pixel section, and similarly divides 480 pixels in length into three 144 pixel sections and one 48 pixel section. As a result, the captured image with 640*480 pixels is divided into nine images with 176*144 pixels, three images with 112*144 pixels, three images with 176*48 pixels, and one image with 112*48 pixels. Then the frame dividing part delivers the respective divided images to the frame processing part.

Figure 5A:
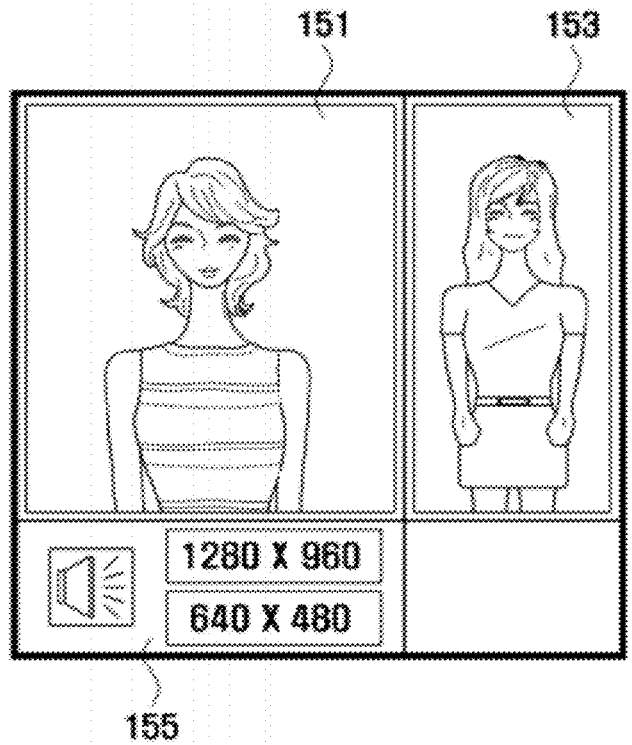
Figure 5B:
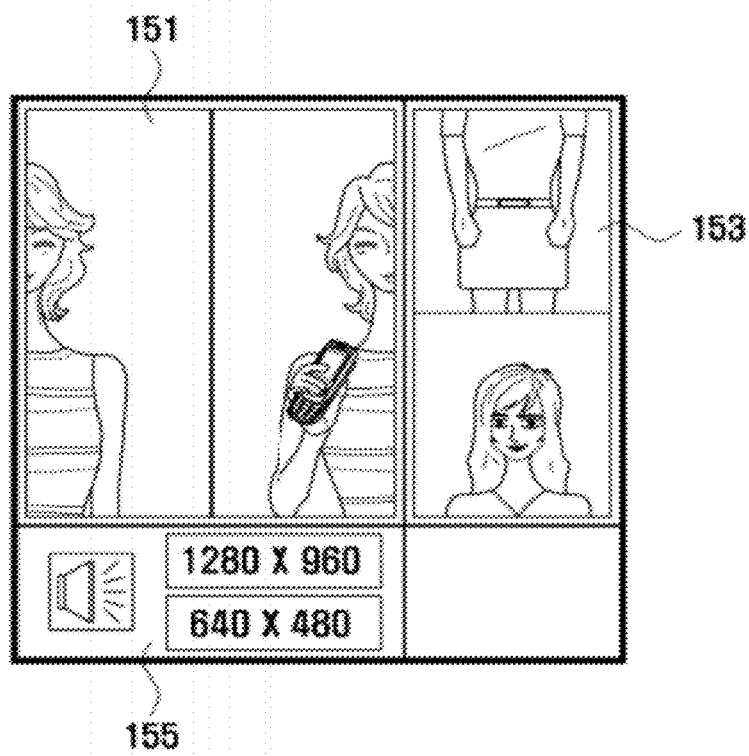

FIGS. 5A to 5C are exemplary views that illustrate an interface of a display unit according to an exemplary embodiment of the present invention.

Referring to FIG. 5A, the display interface may include a combined image region 151 which displays a combined image, a captured image region 153 which displays an image captured by the camera module, and a button region 155 in which buttons used for executing a capture call function are disposed. The combined image region 151 outputs a combined image which corresponds to a captured image received from the counterpart mobile terminal and is combined in the frame combining part 167.

Such combined images can be changed at a predefined period. More specifically, if the transfer period of the captured image with the first resolution is determined to be three seconds, a combined image displayed in the combined image region 151 may be updated every three seconds. FIG. 5B exemplarily shows an update process in which a current combined image is replaced with a new combined image. As illustrated in FIG. 5B, a current combined image disappears slowly in a given direction, and at the same time a new combined image gradually replaces the disappearing image. FIG. 5C illustrates a new combined image displayed in the combined image region 151 as a result of a replacement. As discussed above, disappearing and new combined images are captured images the counterpart mobile terminal provides.

The captured image region 153 displays a captured image, i.e., a still image, taken by the camera module, and changes a currently displayed image at a predefined period, e.g., three seconds. Here, the display change period of captured images may correspond to the above-discussed transfer period of captured images between mobile terminals. Like the replacement of the combined images, a current captured image disappears slowly in a given direction, and at the same time a new captured image replaces gradually the disappearing image.

In an exemplary embodiment, a disappearing image and a new replacing image are simultaneously moved in the same direction so that a new image may gradually replace a disappearing image. In another exemplary embodiment, the replacement of the combined images or the captured images may use an overlap technique. That is, while a current image fades out, an overlapped new image fades in. In addition, the display unit may use any other display technique to update combined images and captured images.

Heretofore, a communication system and a mobile terminal used therein which allow a capture call function in accordance with exemplary embodiments of the present invention has been described. Hereinafter, a process in which the mobile terminal executes a capture call function will be described. Although the following description will separately employ a transmission function and a reception function of the mobile terminal, both functions may be substantially and simultaneously available in one mobile terminal.

FIG. 6 is a flow diagram that illustrates a process of transmitting transport frames at a transmitting mobile terminal during a video call based on a capture call function according to an exemplary embodiment of the present invention.

Referring to FIG. 6, the mobile terminal outputs a predefined initial screen on the display unit in step S101. This initial screen may be an idle screen, a main screen, a menu screen, or any other predefined alternative screen. Furthermore, step S101 may be performed after a booting process.

Next, the mobile terminal receives a phone number input through the input unit in step S103. More specifically, a user can directly input a phone number of the receiving mobile terminal on the input unit. Alternatively, a user can select a specific phone number in a phonebook or a call history.

Next, the control unit of the mobile terminal determines whether an input signal for a capture call is received from the input unit in step S105. The input unit may have a hot key or a shortcut key for a capture call. When such a special key for a capture call is activated, the control unit may receive an input signal for a capture call based on a predefined phone number. Alternatively, the control unit may receive an input signal for activating a menu for a predefined phone number. This menu may contain various call related items such as a capture call, a voice call, a video call, etc. In that case, the control unit may receive an input signal of selecting an item of a capture call. If a typical call other than a capture call is selected, the control unit may perform the selected typical call such as a voice call and a video call in step S107.

If an input signal for a capture call is received in the step S105, the control unit activates the RF unit and controls the transmission/reception of signals to establish a communication channel to the counterpart mobile terminal corresponding to the inputted phone number in step S109. More particularly, in step S109, the control unit negotiates with the counterpart mobile terminal regarding data transmission conditions such as the transmission rate of transport streams and the resolution size of transport frames in the transport streams. Here, the resolution size may be used as a division criterion of a captured image at the frame dividing part of the control unit. That is, when the image receiving part of the control unit controls the camera module to capture an image with the first resolution, the frame dividing part may divide the captured image with the first resolution into images with the negotiated second resolution.

Next, the control unit controls the image receiving part so that the camera module may capture an image based on the first resolution selected by a user or predefined as a default value in step S111. In this step, a user may modify the first resolution, and therefore the control unit may offer a menu for the modification of the first resolution. The first resolution may be changed in the middle of a call based on a capture call, depending on an input signal from the input unit. That is, although the first resolution is determined by an initial setting, the first resolution may vary according to a user's choice.

If only the first resolution is changed without a corresponding change of the second resolution, the period of capturing images at the camera module may be also changed. That is, if the first resolution is increased or decreased at a fixed second resolution, the number of the transport frames to be delivered is increased or decreased accordingly. Also, the time required for delivering the transport frames is increased or decreased. As a result, the period of outputting the combined images on the display unit is increased or decreased, so the control unit may change the image capturing period.

In this step, the control unit also controls that each of the time required for capturing images, dividing images, and converting images into streams is overlapped between the previous captured image and the current captured image. That is, the control unit may control the camera module to capture the current image while the previous captured image is divided. Furthermore, the control unit may control the frame dividing part to divide the current captured image while the previous captured image is converted into streams. By doing so, the captured images can be continuously delivered at a determined period.

When or after the image receiving part controls the camera module to capture an image with the first resolution in the step S111, the control unit divides the captured image into images with the second resolution in step S113. As discussed above, the second resolution may be determined to meet the negotiated transport rate based on data transmission conditions between the mobile terminals.

Next, the control unit converts the divided images into transport frames in step S115. Then the control unit inserts audio signals and control signals into the transport frames, and converts the transport frames into transport streams which are a suitable form for delivering through the RF unit in step S117. The transport streams may be transmitted at the predefined transfer rate.

Next, the control unit determines whether an input signal for ending a capture call is received in step S119. If there is no ending signal, the control unit further determines whether the first resolution is changed in step S121. That is, in the step S121, the control unit determines whether an input signal for changing the first resolution is received from the input unit.

If the first resolution is not changed, the control unit returns to the previous step S111 to acquire the next captured image with the unchanged first resolution. If the first resolution is changed, the control unit controls the camera module to capture a new image with the changed first resolution in step S123. Then the control unit returns to the previous step S113 to divide the capture image.

As discussed above, the first resolution changing step S121 may be performed by an input signal from the input unit. Alternatively, step S121 may be automatically performed under the control of the control unit when the transfer period of the captured images is fixed. That is, if network transmission conditions are changed with the transfer period fixed, the first resolution may be changed to be adapted to the fixed period. More specifically, assume that the transport frames with the second resolution are delivered at a fixed transfer period, for example, at intervals of four seconds. In that case, if network conditions are poor and not sufficient to deliver all required frames within four seconds, the control unit controls the camera module to capture an image with a third resolution that is lower than the first resolution. By doing so, the number of transport frames to be delivered becomes reduced, and therefore the control unit can deliver the captured images at the fixed transfer period of four seconds without changing the period.

FIG. 7 is a flow diagram that illustrates a receiving process at a receiving mobile terminal during a video call based on a capture call function according to an exemplary embodiment of the present invention.

Referring to FIG. 7, the receiving mobile terminal outputs a predefined initial screen on the display unit in step S201. This initial screen may be an idle screen, a main screen, a menu screen, or any other predefined alternative screen. Furthermore, step S201 may be performed after a booting process.

Next, the control unit of the receiving mobile terminal determines whether a request for a capture call is received from the transmitting mobile terminal in step S203. If there is no request for a capture call, the control unit performs another function based on an input signal from the input unit in step S205.

If a request for a capture call is received from the transmitting mobile terminal in the step S203, the control unit negotiates with the transmitting mobile terminal regarding data transmission conditions in step S207. As discussed above, the negotiated conditions may include the transmission rate of transport streams and the resolution size of transport frames in the transport streams.

Next, the control unit receives the transport streams from the transmitting mobile terminal in step S209, and performs a demultiplexing of the received streams in step S211. That is, in step S211, the control unit separates audio signals, control signals and transport frames from the received streams. After demultiplexing, the audio signals are delivered to the audio processing unit. Furthermore, since images delivered by a capture call function are still images, the control unit may not perform a synchronization process for audio and video signals.

Next, the control unit decodes and restores the transport frames to the divided images in step S213, and then creates a combined image by combining the divided images in step S215. Here, the control unit may check a header of the first transport frame and thereby ascertain in advance the entire number of transport frames forming a single combined image. Alternatively, the control unit may consider that the transport frames received for one period correspond to a single combined image.

After creating the combined image, the control unit controls the display unit to output the combined image in step S217. In this step, the control unit may update the combined image by using a display technique. As discussed above, such a display technique for update may include a technique to simultaneously move both images in the same direction and an overlap technique using fade in/out.

Next, the control unit determines whether an input signal for ending a call based on a capture call is received in step S219. If there is no ending signal, the control unit further determines whether data transmission conditions are changed in step S221. Here, the control unit may use received signal strength to determine a change of data transmission conditions. That is, if received signal strength is lower than a given value, the control unit determines that data transmission conditions are changed. Alternatively, to determine a change of data transmission conditions, the control unit may use parameters such as system information received periodically or in real time from the communication network.

Furthermore, if the transmitting mobile terminal changes the first resolution of the captured images, the control unit may return to the previous step S207 to again negotiate data transmission conditions. In that case, as data transmission conditions are changed, the number of the divided images forming a single combined image is also changed. So the control unit may regulate a timing of creating the combined image in the aforesaid step S215 and a timing of outputting the combined image in the aforesaid step S217. If there is no change in data transmission conditions in the aforesaid step S221, the control unit returns to the previous step S209.

As discussed above, the mobile terminal in accordance with exemplary embodiments of the present invention may realize a high-quality video call by periodically acquiring still images with a relatively higher resolution and by adaptively delivering them according to changes of transmission conditions.

On the one hand, if only one communication channel is established to execute a capture call function between mobile terminals, the mobile terminal of exemplary embodiments of the present invention may insert audio signals into each of the transport frames. Since the transport stream is demultiplexed and thereby the audio signals are separated as discussed above, the audio signals can be delivered to the audio processing unit after demultiplexing. Alternatively, when a voice call channel is established separately from a communication channel for a capture call, the previously mentioned frame processing part not only controls audio signals through a voice call channel, but also separately controls the transport frames to create the combined image.

On the other hand, according to the above description, a capture call function is executed through a menu on the initial screen. However, exemplary embodiments of the present invention are not limited to that. In an alternative exemplary embodiment, a capture call based video call may be executed in the middle of a normal video call. That is, the mobile terminal of exemplary embodiments of the present invention may convert a normal video call into a capture call and vice versa.

While this invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. A method for transmitting a video call, the method comprising:
    acquiring a still image with a first resolution at a predefined period by using a camera module;
    dividing the still image into a plurality of images with a second resolution that is smaller than the first resolution;
    encoding the plurality of divided images into transport frames, respectively;
    converting the transport frames into a transport stream; and
    transmitting the transport stream at the predefined period.

2. The method of claim 1, further comprising:
    negotiating with a counterpart mobile terminal regarding data transmission conditions to determine the second resolution, the counterpart mobile terminal receiving the transport stream.

3. The method of claim 2, further comprising:
    determining whether the data transmission conditions are changed, and
    if the data transmission conditions are changed, modifying at least one of the predefined period, the first resolution, and a number of the transport frames of the transport stream transmitted per second.

4. The method of claim 1, further comprising:
    determining whether the first resolution is changed; and
    if the first resolution is change, changing the predefined period.

5. The method of claim 1, further comprising:
    inserting information regarding the number of the divided images corresponding to the single still image into a header of a first one of the transport frames.

6. The method of claim 1, further comprising:
    acquiring audio signals,
    wherein the transmitting of the transport stream includes assigning the audio signals to the respective transport frames, and inserting the audio signals into the transport stream.

7. A method for receiving a video call, the method comprising: receiving a transport stream including a specific number of transport frames at a predefined period; retrieving the specific number of transport frames from the transport stream; restoring the transport frames to divided images, respectively; creating a combined image by combining the divided images; and outputting the combined image at the predefined period, wherein the combined image has a first resolution and the divided images have a second resolution that is smaller than the first resolution.

8. The method of claim 7, further comprising:
    checking a header of a first one of the transport frames; and
    determining the specific number of the transport frames from the header of the first one of the transport frames.

9. The method of claim 8, wherein the creating of the combined image is based on the number of the divided images that correspond to the specific number of the transport frames.

10. The method of claim 7, further comprising:
    negotiating with a counterpart mobile terminal regarding data transmission conditions for receiving the transport stream, the counterpart mobile terminal transmitting the transport stream.

11. The method of claim 10, further comprising:
    determining whether the data transmission conditions are changed; and
    if the data transmission conditions are changed, modifying the predefined period.

12. The method of claim 7, wherein the outputting of the combined image at the predefined period comprises updating a previous combined image with the combined image.

13. An apparatus for a video call, the apparatus comprising:
    a camera module for acquiring a still image;
    an image receiving part for controlling the camera module so that the camera module acquires the still image with a first resolution at a predefined period;
    a frame dividing part for dividing the still image into a plurality of images with a second resolution that is smaller than the first resolution; and
    a frame processing part for encoding the plurality of divided images into transport frames, respectively, for converting the transport frames into a transport stream, and for transmitting the transport stream at a predefined period.

14. The apparatus of claim 13, wherein the frame processing part receives the transport stream at the predefined period, retrieves the transport frames from the received transport stream, and restores the retrieved transport frames to the respective divided images with the second resolution.

15. The apparatus of claim 14, further comprising:
    a frame combining part for creating a combined image with the first resolution by combining the divided images;
    a display unit for outputting the combined image at the predefined period; and
    wherein the display unit, when outputting the combined image at the predefined period, updates a previous combined image with the combined image.

16. The apparatus of claim 13, wherein the frame processing part negotiates with a counterpart mobile terminal regarding data transmission conditions to determine the second resolution, the counterpart mobile terminal receiving the transport stream.

17. The apparatus of claim 16, wherein the frame processing part determines whether the data transmission conditions are changed, and if the data transmission conditions are changed, modifies at least one of the predefined period, the first resolution, and a number of the transport frames transmitted per second.

18. The apparatus of claim 13, wherein the frame processing part inserts information regarding the number of the divided images corresponding to the single still image into a header of a first one of the transport frames.

19. The apparatus of claim 13, further comprising:
    an audio processing unit for acquiring and processing audio signals,
    wherein the frame processing part assigns the audio signals to the respective transport frames, and inserts the audio signals into the transport stream.

* * * * *